May 5, 1925.  1,536,625
W. L. PAUL
TRACTOR HITCH
Filed July 2, 1921  3 Sheets-Sheet 2
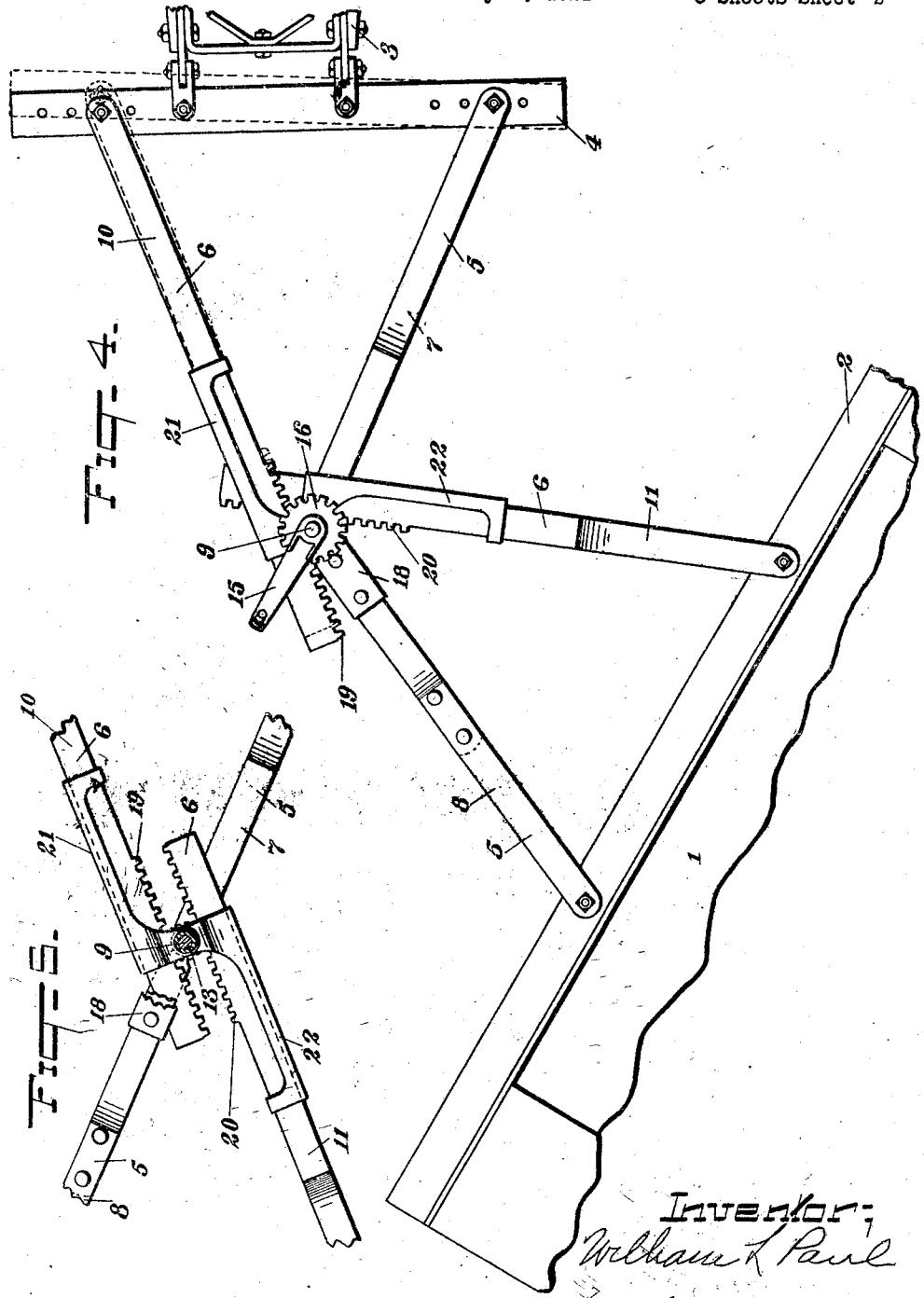

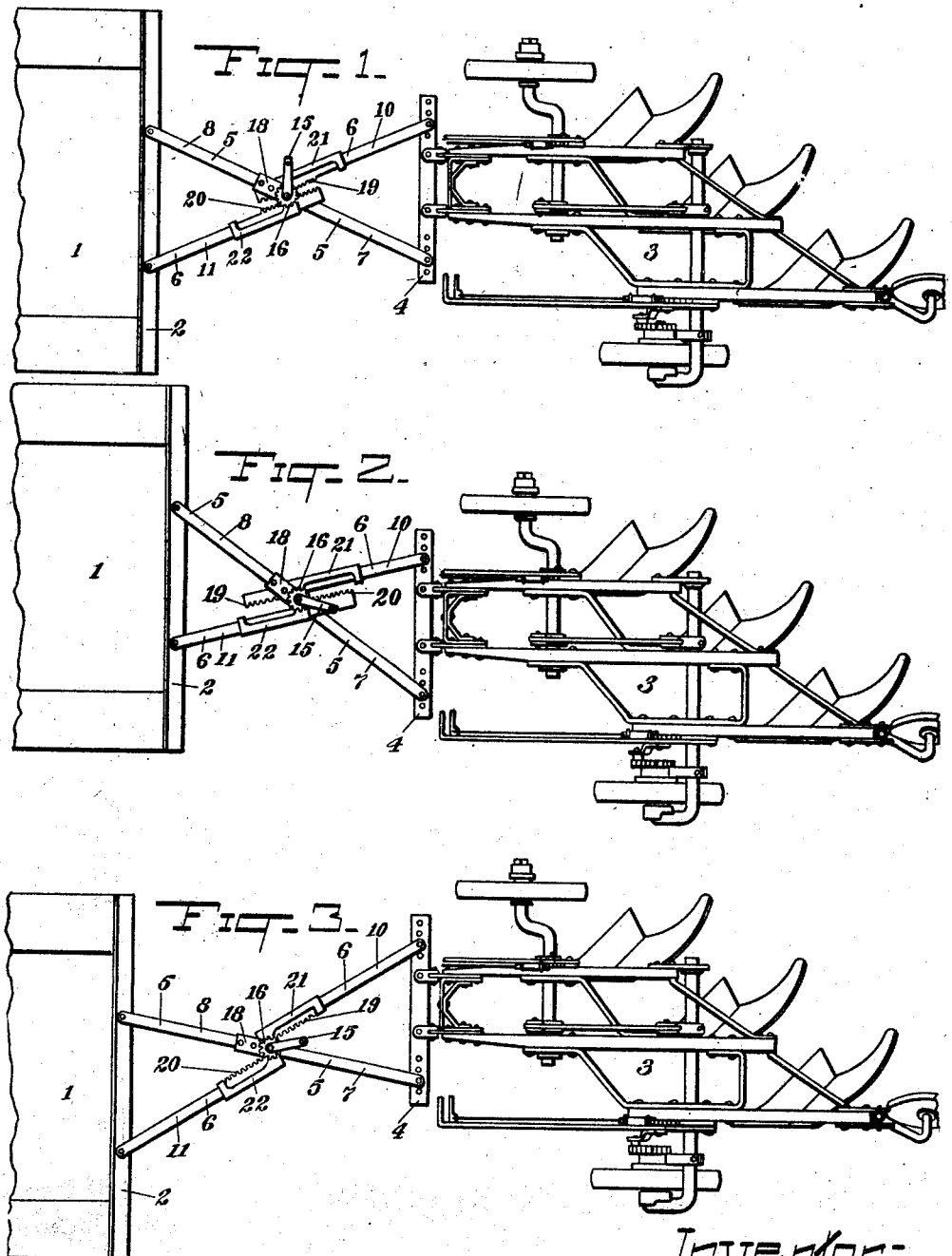

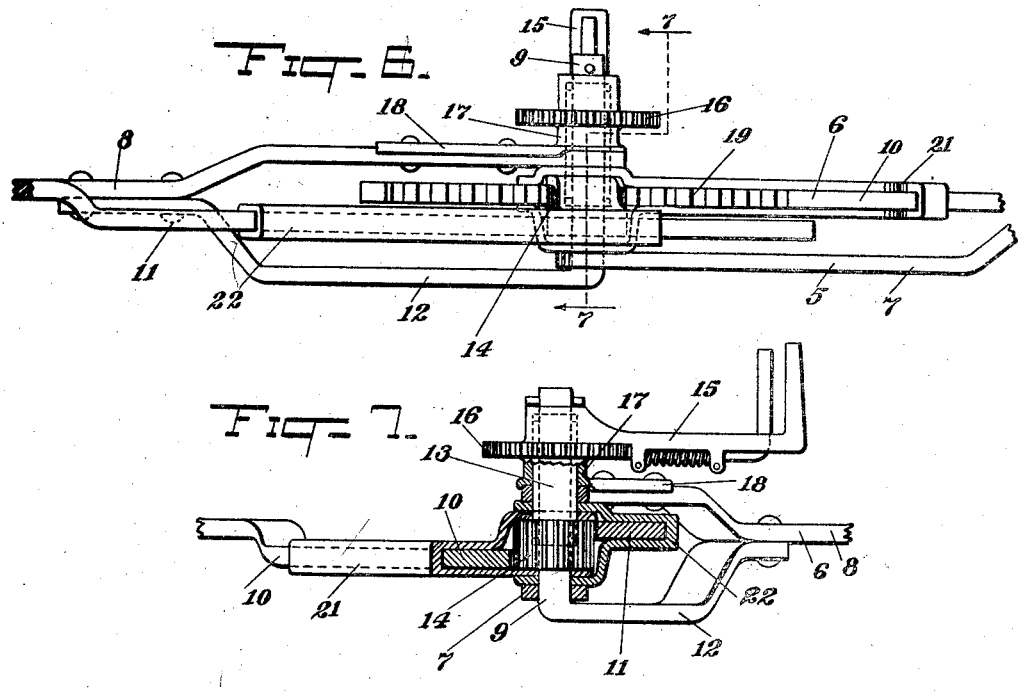

Patented May 5, 1925.

1,536,625

UNITED STATES PATENT OFFICE.

WILLIAM L. PAUL, OF BERKELEY, CALIFORNIA, ASSIGNOR TO DEERE & COMPANY, OF MOLINE, ILLINOIS, A CORPORATION OF ILLINOIS.

TRACTOR HITCH.

Application filed July 2, 1921. Serial No. 482,028.

*To all whom it may concern:*

Be it known that I, WILLIAM L. PAUL, a citizen of the United States, residing at Berkeley, in the county of Alameda and State of California, have invented certain new and useful Improvements in Tractor Hitches, of which the following is a specification, reference being had therein to the accompanying drawing.

My invention relates to that class of hitch devices employed to connect to a tractor an object to be drawn, and it is more particular applied to agricultural machinery, in this instance a gang plow, and the object of my invention is to provide a hitch mechanism by which the plow can be drawn directly in line with the tractor and which is adjustable to draw the plow to either side of that line whether the tractor and attached vehicle are in motion or not.

Referring to the drawings in which similar numerals indicate indentical parts.

Figure 1 illustrates the application of my device to a gang plow and a tractor one in a direct line with the other.

Figure 2 is a similar view to Figure 1, but showing the plow drawn to the left of the longitudinal center of the tractor.

Figure 3 shows the plow drawn to the right of the longitudinal center of the tractor.

Figure 4 is an enlarged view illustrating the position of the hitch parts when the tractor is turning to travel in a new direction.

Figure 5 is an enlarged detail, in part section, of the adjustment part of my device in position as shown in Figure 2.

Figure 6 is an enlarged detail side elevation of the adjustment part of my device, and Figure 7 is a section on the line 7—7 of Figure 6.

I show at 1 the rear part of a tractor provided with a transverse rear frame bar 2 to which is connected a gang plow 3 having a drawbar 4. My device forming the connection between the tractor and plow is composed of cross reaches 5 and 6. The reach bar 5 is formed of a rear section 7, pivotally attached to the draw bar 4 to the left of the longitudinal center of the plow, and a forward section 8 pivotally attached to the transverse bar 2 of the tractor to the right of the longitudinal center of the tractor. The sections 7 and 8 extend toward each other and are pivotally connected by a vertical spindle 9.

The cross reach 6 is formed of a rear section 10 pivotally attached to the draw bar 4 to the right of the longitudinal center of the plow, and a forward section 11 pivotally attached to the transverse bar 2 of the tractor to the left of the longitudinal center of the tractor. The spindle 9 is preferably integral with a bracket 12 riveted, or otherwise secured, to the section 8 and extending through a sleeve 13. The sleeve 13 is loosely mounted on the spindle 9 and rigidly secured to its lower end is a pinion 14, the upper end of the sleeve carrying, rigid therewith, a crank lever 15 which is provided with the ordinary type of dog or detent to engage with notches in a circular rack 16; the rack 16 is integral with a collar 17, through which the sleeve 13 loosely passes, and is provided with an arm 18 which is riveted to the section 8. The section 10 is provided with a series of rack teeth 19 which engage with the pinion 14, and the section 11 is provided with a similar series of rack teeth 20 engaging with the pinion 14 opposite the section 10. The forward end of the section 10 is supported in an elongated bearing 21 in which it is free to slide when moved by operation of the pinion 14, and the rear end of the section 11 is slidably supported in a similar manner in a similar bearing 22; both of the bearings 21 and 22 are pivotally supported on the spindle 9 and hold the racks 19 and 20 in constant engagement with the pinion 14.

As before stated the circular rack 16 is secured on the section 8 by the arm 18 and is not revoluble, consequently the lever 15 is firmly held in any position of adjustment by the latch thereon engaging with the circular rack 16. In Figure 1 the tractor and plow are in alinement and if it is desired to have the plow operate to the right of the central longitudinal line of the tractor I disengage the lever 15 from the circular rack 16 and as the lever is rigidly secured to the sleeve 13, on which the pinion 14 is mounted, a clockwise operation of the lever will rotate the pinion 14, and as the latter is in mesh with the racks on the sections 10 and 11 of the reach 6, the sections are moved longitudinally away from each other lengthening the reach 6 and causing the plow to assume, to a more or less degree, the position shown in Figure 3 which is maintained by locking the lever 15 to the circular rack 16.

An operation of the lever reverse to that just described will guide the plow again to the position shown in Figure 1, and if the operation is continued in this reverse direction the plow will be guided to the left of the central longitudinal line of the tractor as shown in Figure 2.

As previously stated the cross reaches 5 and 6 are each formed of two sections and are pivotally connected intermediate their lengths, the reach 5 being a permanent length, and the reach 6 having the sections thereof adjustable longitudinally toward or from each other to effect the desired offset of the plow, or other vehicle, relative to the tractor. I find however, that flexibility is desirable in the means attaching the object to be drawn to the tractor, and to that end I pivotally connect the reaches together, intermediate their lengths, by a common pivot on which the tractor, or the object drawn thereby, can swing freely when making a turn or to accommodate the position of each relative to the line of draft. This flexibility does not interfere in any way with the operation of offsetting the plow or other vehicle, for the sections of the reach 6 are adjustable longitudinally toward or from each other irrespective of the relative positions of the tractor and the object drawn thereby.

And it will be further noted that the pivotal point of the connection of the reaches, one with the other, relative both to the median line of the tractor and plow varies in the adjustment of the plow to right or left, i. e., when the plow is moved to the left, as in Figure 2, the pivotal juncture of the reaches will be to the left of the median line of the tractor and to the right of the median line of the plow, and if the plow is moved to the right the pivotal juncture of the reaches will be to the left of the median line of the plow and to the right of the median line of the tractor, as shown in Figure 3. In Figure 1, the force of the pull is practically equal between the reaches, but when the plow is in operative position to the left of the median line of the tractor, as in Figure 2, the force of the draft is unevenly distributed, the reach 6 sustaining the greater part of it and the reach 5 operating more as a brace against the tendency of the plow to turn landward, but if, as in Figure 3, the operative position of the plow is to the right of the median line of the tractor, then the conditions are reversed, the reach 5 sustaining the greater force of the draft and the reach 6 operating more as a brace to keep the plow to its work.

In pulling, except in turning, the sections 7 and 8 of the reach 5 are in alinement, and the sections 10 and 11 of the reach 6 are in parallel lines, one with the other, consequently it follows that, as the reaches 5 and 6 cross at a pivotal point common to both and one reach is shortened or lengthened, according to the lateral adjustment of the plow, the pivotal point must move with the adjustment of the plow, as previously stated, in order that the reaches maintain the alinement above noted.

What I claim is—

1. A hitch including cross reaches connecting a tractor with an object to be drawn, one of said reaches formed of two adjustable sections, and means operable at will to adjust said sections longitudinally in opposite directions.

2. A hitch including cross reaches connecting a tractor with an object to be drawn, one of said reaches formed of two sections pivotally connected, the second reach in two adjustable sections, and means operable at will to adjust the sections of the second reach longitudinally in opposite directions.

3. A hitch connecting a tractor with an object to be drawn and including cross reaches, one of said reaches being of permanent length and in two sections pivotally connected, the second reach formed of two sections, and means operable at will to adjust the sections of the second reach longitudinally toward or from each other.

4. A hitch connecting a tractor with an object to be drawn and including cross reaches, one of said reaches being of permanent length and in two sections pivotally connected, the second reach formed of two sections, and means supported on the first reach and connected with the sections of the second reach and operable at will to adjust the sections of the second reach longitudinally toward or from each other.

5. A hitch including cross reaches connecting a tractor with an object to be drawn, one of said reaches being of permanent length and in two sections pivotally joined together, the second reach formed of two sections, and means supported on the first reach at the pivotal joint thereof and connected with the sections of the second reach and operable at will to adjust the sections of the second reach longitudinally toward or from each other.

6. A hitch including cross reaches connecting a tractor with an object to be drawn, one of said reaches being of permanent length and in two sections pivotally joined together and alined during a forward movement of the tractor, the second reach formed of two sections, and means supported on the first reach at the pivotal joint thereof and connected with the sections of the second reach and operable at will to adjust the sections of the second reach longitudinally toward or from each other.

7. A hitch including cross reaches connecting a tractor with an object to be drawn, one of said reaches being of permanent length and in two sections pivotally joined together, the second reach formed of two sections, a pinion mounted on the first reach, rack teeth on each of the sections of the second reach in engagement with said pinion, and means operable at will to rotate said pinion and adjust the sections of the second reach longitudinally toward or from each other.

8. A hitch including cross reaches connecting a tractor with an object to be drawn, one of said reaches being of permanent length and in two sections connected together by a pivot on the one section, a pinion rotatable on said pivot, the second reach formed of two sections, rack teeth on each of the sections of the second reach and in engagement with said pinion, a lever operable at will to rotate said pinion and adjust the sections of the second reach longitudinally toward or from each other, and means to lock said lever at varying points of adjustment.

9. A hitch including cross reaches pivotally connected to a tractor and an object drawn thereby, one reach of permanent length and in two sections pivotally joined, the second reach formed of two sections and movably supported on the first reach at the joint thereof, and means supported on the first reach and connected with the sections of the second reach and operable at will to adjust the sections of the second reach longitudinally.

10. A hitch including cross reaches connecting a tractor with an object to be drawn, one of said reaches being of permanent length and in two sections pivotally connected, the second reach formed of two sections having adjacent ends slidably supported on the first reach, and means supported on the first reach and connected with the sections of the second reach and operable at will to adjust said sections longitudinally.

11. A hitch including cross reaches connecting a tractor with an object to be drawn, one of said reaches being of permanent length and in two sections pivotally connected, the second reach formed of two sections having adjacent ends slidably and independently supported on the first reach, and means supported on the first reach and connected with the sections of the second reach and operable at will to adjust the sections thereof longitudinally.

12. A hitch connecting a tractor with an object to be drawn and including reaches each composed of two sections pivotally attached respectively to the tractor and to said object, said reaches crossing and connected at the junction of their sections by a vertical pivot whereby the tractor and said object are free to swing relative to each other, one of said reaches being of permanent length, and mechanism operable to move the sections of the second reach longitudinally irrespective of the relative position of the tractor and said object.

13. A hitch including cross reaches connecting a tractor with an object to be drawn, both of said reaches pivotally connected together intermediate their lengths, one of said reaches formed of two longitudinally adjustable sections, means operable to adjust said sections longitudinally toward each other to shift said object to the left of the median line of the tractor and simultaneously position the pivotal connection of the reaches to the right of the median line of said object and to the left of the median line of the tractor.

14. A hitch including cross reaches connecting a tractor with an object to be drawn, both of said reaches pivotally connected together intermediate their lengths, one of said reaches formed of two longitudinally adjustable sections, means operable to adjust said sections longitudinally away from each other to shift the said object to the right of the median line of the tractor and simultaneously position the pivotal connection of the reaches to the left of the median line of the plow and to the right of the median line of the tractor.

15. A hitch including cross reaches connecting a tractor with an object to be drawn, both of said reaches pivotally connected together intermediate their lengths, one of said reaches formed of two longitudinally adjustable sections, means operable to adjust said sections longitudinally toward or from each other, and means to secure said sections from longitudinal movement.

WILLIAM L. PAUL.